US012655656B2

(12) United States Patent
Sims et al.

(10) Patent No.: US 12,655,656 B2
(45) Date of Patent: Jun. 16, 2026

(54) DOOR STRIKE ASSEMBLY WITH A REVOLVING LATCH EJECTOR

(71) Applicant: Hanchett Entry Systems, Inc., Phoenix, AZ (US)

(72) Inventors: Ryan M. Sims, Mesa, AZ (US); Joshua T. Peabody, Phoenix, AZ (US)

(73) Assignee: Hanchett Entry Systems, Inc., Phoenix, AZ (US)

(*) Notice: Subject to any disclaimer, the term of this patent is extended or adjusted under 35 U.S.C. 154(b) by 0 days.

(21) Appl. No.: 18/392,566

(22) Filed: Dec. 21, 2023

(65) Prior Publication Data

US 2024/0125147 A1 Apr. 18, 2024

Related U.S. Application Data

(62) Division of application No. 16/657,580, filed on Oct. 18, 2019, now Pat. No. 11,866,959.

(Continued)

(51) Int. Cl.

*E05B 47/00* (2006.01)
*E05B 63/00* (2006.01)
*E05B 63/04* (2006.01)

(52) U.S. Cl.

CPC ...... *E05B 47/0047* (2013.01); *E05B 47/0012* (2013.01); *E05B 63/0056* (2013.01);

(Continued)

(58) Field of Classification Search

CPC ............. E05B 47/0046; E05B 47/0047; E05B 63/0056; E05B 63/04; E05B 63/042;

(Continued)

(56) References Cited

U.S. PATENT DOCUMENTS 1,194,637 A 8/1916 Joy
3,912,311 A 10/1975 Carvell et al.

(Continued)

FOREIGN PATENT DOCUMENTS

BR PI0510165 A * 10/2007 ............. E05F 15/14
BR PI0510165 2/2016

(Continued)

*Primary Examiner* — Christine M Mills
*Assistant Examiner* — Peter H Watson
(74) *Attorney, Agent, or Firm* — Woods Oviatt Gilman LLP; Dennis B. Danella, Esq.

(57) ABSTRACT

A door strike assembly includes a strike housing and latch release assembly. The door strike assembly is used in conjunction with a lockset which includes a door latch moveable from a latched condition when a door is closed and an unlatched condition where the door may be opened. The lockset includes a deadlatch to prevent unauthorized movement of the door latch when the door is closed. The latch release assembly is received within the strike housing and includes a latch ejector which engages the deadlatch when the door is closed. A motor is coupled to the latch ejector where actuation of the motor rotates the latch ejector to disengage the latch ejector from the deadlatch. Further rotation of the latch ejector causes the latch ejector to engage the door latch to move the door latch to the unlatched condition such that the door may be opened.

1 Claim, 10 Drawing Sheets

Related U.S. Application Data

(60) Provisional application No. 62/747,407, filed on Oct. 18, 2018.

(52) U.S. Cl.
CPC ...... *E05B 63/04* (2013.01); *E05B 2047/0022* (2013.01); *E05B 2047/0024* (2013.01); *E05B 2047/0067* (2013.01)

(58) Field of Classification Search
CPC ......... E05B 2015/0285; E05B 47/0012; Y10T 292/68; Y10T 292/696; Y10T 292/699; Y10T 292/702
See application file for complete search history.

(56) References Cited

U.S. PATENT DOCUMENTS

| | | | | |
|---|---|---|---|---|
| 5,127,691 | A * | 7/1992 | Herron ................ | E05B 47/0047 292/144 |
| 5,474,342 | A | 12/1995 | Smith et al. | |
| 6,022,056 | A | 2/2000 | Cope et al. | |
| 6,581,991 | B2 | 6/2003 | Galindo | |
| 8,783,744 | B2 | 7/2014 | Scheffler et al. | |
| 2006/0267349 | A1 | 11/2006 | Garneau et al. | |
| 2016/0279808 | A1 | 9/2016 | Doughty et al. | |

FOREIGN PATENT DOCUMENTS

| | | |
|---|---|---|
| EP | 1672150 | 6/2006 |
| WO | 2014056109 | 4/2014 |

* cited by examiner

STEP 1:
- POWER APPLIED
- MOTOR ROTATES CAMS

STEP 2:
- DEAD LATCH CAM ALLOWS DEAD LATCH TO DROP INTO STRIKE

STEP 3:
- LATCH BOLT CAM RETRACTS LATCH BOLT

- CAMS HAVE SCOOPED LATCH BOLT AND DEAD LATCH OUT OF STRIKE
- LATCH BOLT RAMPS OUT OF STRIKE WHEN DOOR IS PUSHED OPEN
- UNLOCKED STATE

STEP 1:
·POWER APPLIED
MOTOR ROTATES CAM

STEP 2:
·CAM ALLOWS DEAD LATCH
TO DROP INTO STRIKE

STEP 3:
·LATCH BOLT CAM
RETRACTS LATCH BOLT

STEP 4:
·CAMS HAVE SCOOPED
LATCH BOLT OUT OF STRIKE.
·LATCH BOLT RAMPS OUT OF
STRIKE WHEN DOOR IS
PUSHED OPEN
·UNLOCKED STATE

DOOR STRIKE ASSEMBLY WITH A REVOLVING LATCH EJECTOR

RELATIONSHIP TO OTHER APPLICATIONS AND PATENTS

This application is a divisional application of U.S. patent application Ser. No. 16/657,580 filed on Oct. 18, 2019, which claims the benefit of U.S. Provisional Patent Application No. 62/747,407, filed Oct. 18, 2018, which are hereby incorporated by referenced in their entirety.

TECHNICAL FIELD

The present invention relates to a strike assembly associated with a lockset for latching a hinged door into a frame; more particularly, to an electric strike assembly having a latch ejector configured to eject the associated door latch of the lockset from the strike assembly whereby the door may be opened, and still more particularly to a revolving latch ejector that may be configured in various arrangements to be compatible with a variety of lockset types.

BACKGROUND OF THE INVENTION

As is known in the art of door latching, an electrically-controlled strike assembly is typically mounted in a door frame and engages an associated lockset disposed on or in an edge portion of the door. The lockset generally includes a latch, and possibly a deadlatch. The lockset may be of a variety of types including a cylindrical-type lockset or a mortise-type lockset. If a deadlatch is included, the deadlatch is reciprocally moveable between an enabling position (extended) and a disabling position (depressed) where the enabling position permits movement of the latch from a latched condition where the latch resides within a cavity of the strike assembly, to an unlatched condition where the latch can exit the cavity of the strike assembly to allow the door to open. When in the disabling position, the deadlatch prohibits movement of the latch from the latched condition to the unlatched condition. Typically, the latch is resiliently biased into the latched condition and the deadlatch is resiliently biased into the enabled position. In a cylindrical-type lockset, the deadlatch is typically centered along the flat face of the latch. In the case of a mortise-type lockset, the deadlatch may be linearly spaced-apart from the latch along the edge portion of the door in a variety of positions relative to the latch.

In view of these varied lockset designs, companies need to manufacture and inventory multiple individual electric strike assemblies to operate properly with each respective lockset. Further, because of the way in which a keeper of the strike assembly must rotate in order to release the latch from the strike, the door frame to which the electric strike is mounted must be cut to provide clearance for the rotating keeper.

Thus, what is needed in the art is a simplified strike assembly, and especially a simplified modular door strike assembly configurable to operate with many different locksets while not requiring cutting of the door frame.

It is a principal object of the present invention to address this, as well as other, needs.

SUMMARY OF THE INVENTION

Briefly described, one aspect of the present invention is directed toward a door strike for use in conjunction with a door latch system of a door. The door latch system includes a door latch selectively moveable from a latched condition when the door is in a closed orientation and an unlatched condition when the door is in an openable orientation. The door latch includes a deadlatch configured to prevent unauthorized movement of the door latch when the door is in the closed orientation. The door strike may comprise a strike housing and a latch release assembly received within the strike housing. The latch release assembly may comprise a latch ejector configured to engage the deadlatch when the door is in the closed orientation. A motor may be coupled to the latch ejector via an actuatable shaft. Actuation of the motor rotates the latch ejector whereby the latch ejector is configured to disengage from the deadlatch to allow the deadlatch to move to its enabling position. Further rotation of the latch ejector causes the latch ejector to engage the door latch whereby the door latch is moved from the latched condition to the unlatched condition such that the door is placed in the openable orientation. The motor may comprise a planetary gear motor.

In accordance with another aspect of the present invention, the latch release assembly may further include a motor housing configured to receive the motor with the shaft extending outwardly through the motor housing. The latch ejector may also include a magnet therein proximate to the motor housing. The motor housing may then include a printed circuit board in communication with a Hall Effect sensor whereby the Hall Effect sensor monitors a rotational position of the latch ejector. Optionally, the position sensor in communication with the printed circuit board may be a High Speed Infrared Emitting diode acting as a transmitter coupled to a Silicon PIN Photodiode acting as a receiver.

In accordance with a further aspect of the present invention, the actuating mechanism comprises an actuation member coupled to a push bar, the actuating member including a pivoting lever coupled to the actuating bar and configured to translate the actuating bar and translating bar to retract the latch when the push bar is in a depressed position and extend the latch when the push bar is in a released position.

In accordance with a further aspect of the present invention, the latch ejector may include a cam portion. The cam portion may be configured to engage the deadlatch when the door is in the closed orientation. Still further, the cam portion may be a removable cam portion that is selectively positionable on the latch ejector so that the latch release assembly may be selectively configured in either a left-handed or right-handed configuration. To that end, the strike housing may include a removable end plate whereby the latch release assembly may be removed from and replaced within the strike housing when selectively configuring the latch release assembly in either the left-handed or right-handed configuration.

In accordance with another aspect of the invention, a method for selectively swapping an electric door strike from either a left-handed or right-handed configuration to the other of the left-handed or right-handed configuration is provided, including the steps of: a) providing an electric door strike having a strike housing including a first removable end plate and a latch release assembly received within the strike housing, the latch release assembly having a latch ejector configured to engage the deadlatch when the door is in the closed orientation and a motor coupled to the latch ejector via an actuatable shaft, wherein actuation of the motor rotates the latch ejector to disengage from the deadlatch and wherein further rotation of the latch ejector causes the latch ejector to engage the door latch whereby the door latch is moved from the latched condition to the unlatched condition such that the door is placed in the openable orientation; b) removing the first removable end plate from the strike housing; c) removing the latch release assembly from the strike housing; d) inverting the latch release assembly end-over-end; e) reinstalling the latch release assembly within the strike housing; and f) replacing the first removable end plate on the strike housing. In a further aspect of the present invention, the method may further include the step of: g) repositioning a cam portion on the latch ejector from one of the left-handed or right-handed configuration to the other of the left-handed or right-handed configuration, wherein step g occurs after either step c or step d.

In accordance with yet another aspect of the invention, a method of operating a strike assembly to release a latch of a door from the strike assembly is disclosed. The strike assembly includes a cylindrically-shaped latch ejector. The strike assembly may be used in conjunction with a mortise-type lockset or a cylindrical-type lockset having a door latch and a deadlatch. The method includes the steps of: a) providing a strike assembly with a rotatable latch ejector in accordance with the invention, wherein the latch ejector has a leading edge, a trailing edge and a recess between the edges, and wherein, when the door is closed, the deadlatch engages the trailing edge of the latch ejector to hold the deadlatch in a depressed condition and the door latch is aligned with the recess, thereby permitting the latch to extend; b) rotating the latch ejector in a direction to allow the deadlatch to disengage the trailing edge and to extend into said recess; c) continuing rotation of the latch ejector so that the leading edge of the latch ejector engages the door latch; and d) continuing further rotation of the latch ejector to cause the leading edge of the latch ejector to retract the door latch from the strike assembly, thereby allowing the door to move from a closed position.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
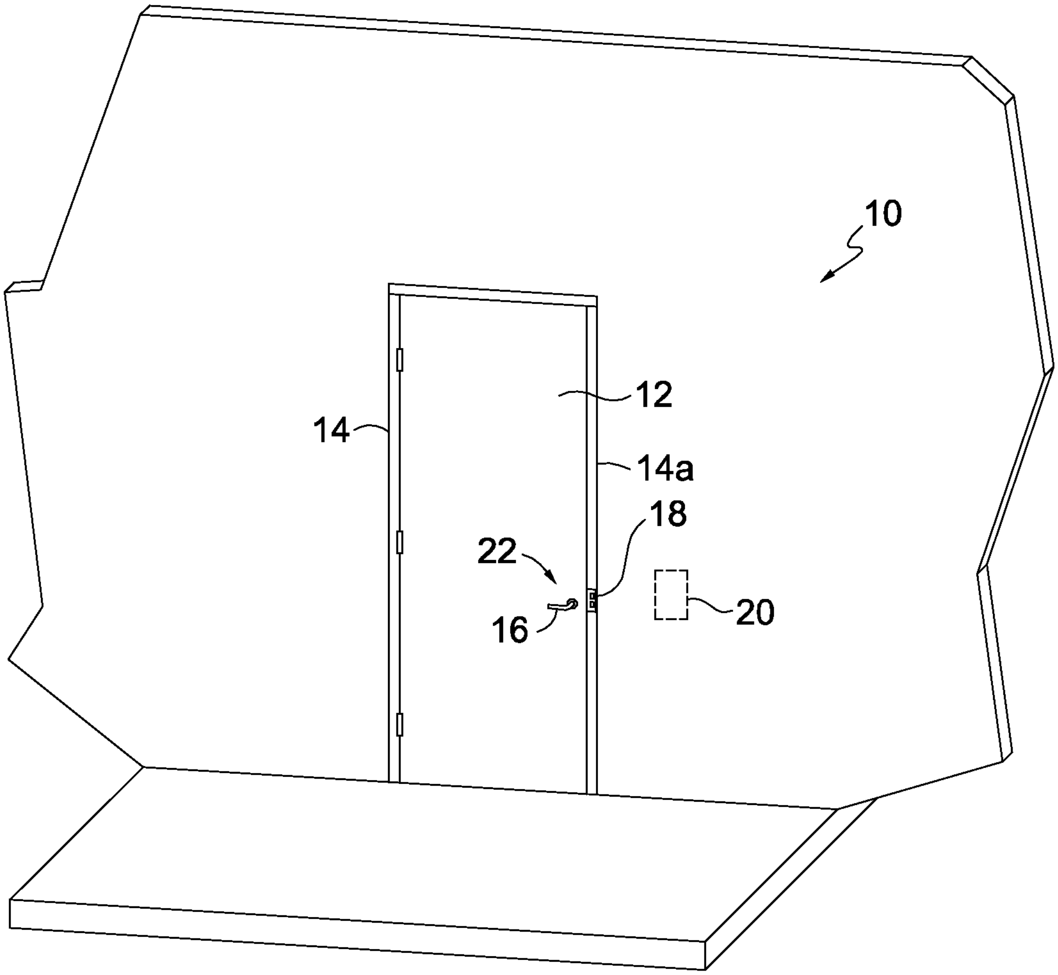
FIG. 1 is a schematic view of a door and door frame including a lockset and associated a door strike assembly.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Referring to FIG. 1, in a typical door locking system 10, door 12 is mounted to door frame 14. Door 12 may be equipped with a lockset 22, including handle, 16, that operates the lockset between extended and retracted positions. A biasing member such as a spring biases a latch of the lockset toward its extended position. When extended, the latch engages a corresponding strike assembly 18 in door frame 14. Strike assembly 18 may be an electrified strike assembly. In a secured setting wherein lockset 22 is locked and the latch of the lockset is extended, an authentication device 20, such as a keypad, swipe card reader, key fob reader or biometric sensor may be provided whereby electric strike assembly 18 is actuated only upon input of proper access credentials at authentication device 20 to thereby allow the latch to exit a cavity of electric strike assembly 18. Door 12 may then be pushed or pulled open without operating the handle 16 of lockset 22. Door 12 may also be opened using lockset 22, such as through turning of the handle which causes the latch to be retracted from electric strike assembly 18.

Figure 2:
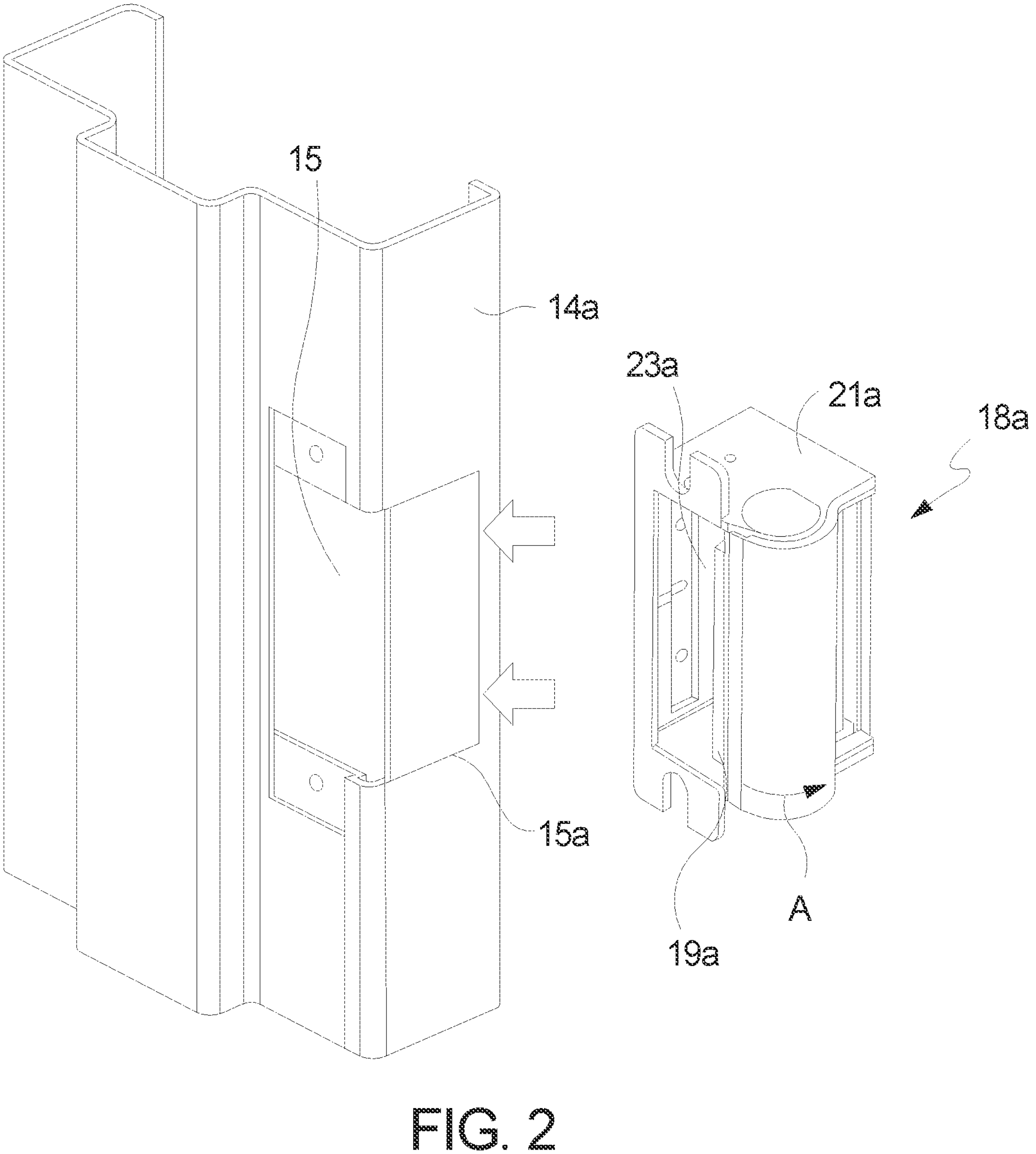
FIG. 2 PRIOR ART
FIG. 2 are perspective views of a prior art strike assembly and a door frame receivable of the strike assembly.

Referring now to FIG. 2, prior art electric strike assembly 18*a* may be secured to door frame 14*a* by mounting screws (not shown). Keeper 19*a* is rotatably mounted within housing 21*a* of electric strike assembly 18*a* as known in the art. The rotational position of keeper 19*a* is controlled by input from an actuator (not shown) internal to the electric strike assembly. When keeper 19*a* is in its secure mode as shown, and with the door closed and the latch of the lockset extended into cavity 23*a* of housing 21*a*, the latch is blocked from exiting the cavity and the door is held closed. When keeper 19*a* is released by the actuator from the position shown in FIG. 2, keeper 19*a* is permitted to rotate in the direction shown by arrow A, thereby permitting the extended latch to exit cavity 23*a* when the door is moved in an opening direction. The exiting latch contacts a ramp surface provided by the rotated keeper and, by its sliding along the ramp's inclined surface, the latch is retracted against its biasing member to allow the latch to exit the strike.

As further shown in FIG. 2, in the prior art, opening 15 must be provided in door frame 14*a* to receive the electric strike assembly 18*a*. However, to permit the rotational movement of the keeper necessary for the latch to exit the cavity of the strike assembly, a keeper clearance notch 15*a* must also be cut in the door frame. Thus, additional fabrication work is needed to install the prior art electric strike assembly 18*a* to a door frame. Moreover, a portion of clearance notch 15*a* remains visible when the door is closed making the appearance of the installed strike assembly less aesthetically pleasing and allowing for an additional point for contamination to enter the electric strike assembly.

Figure 3:
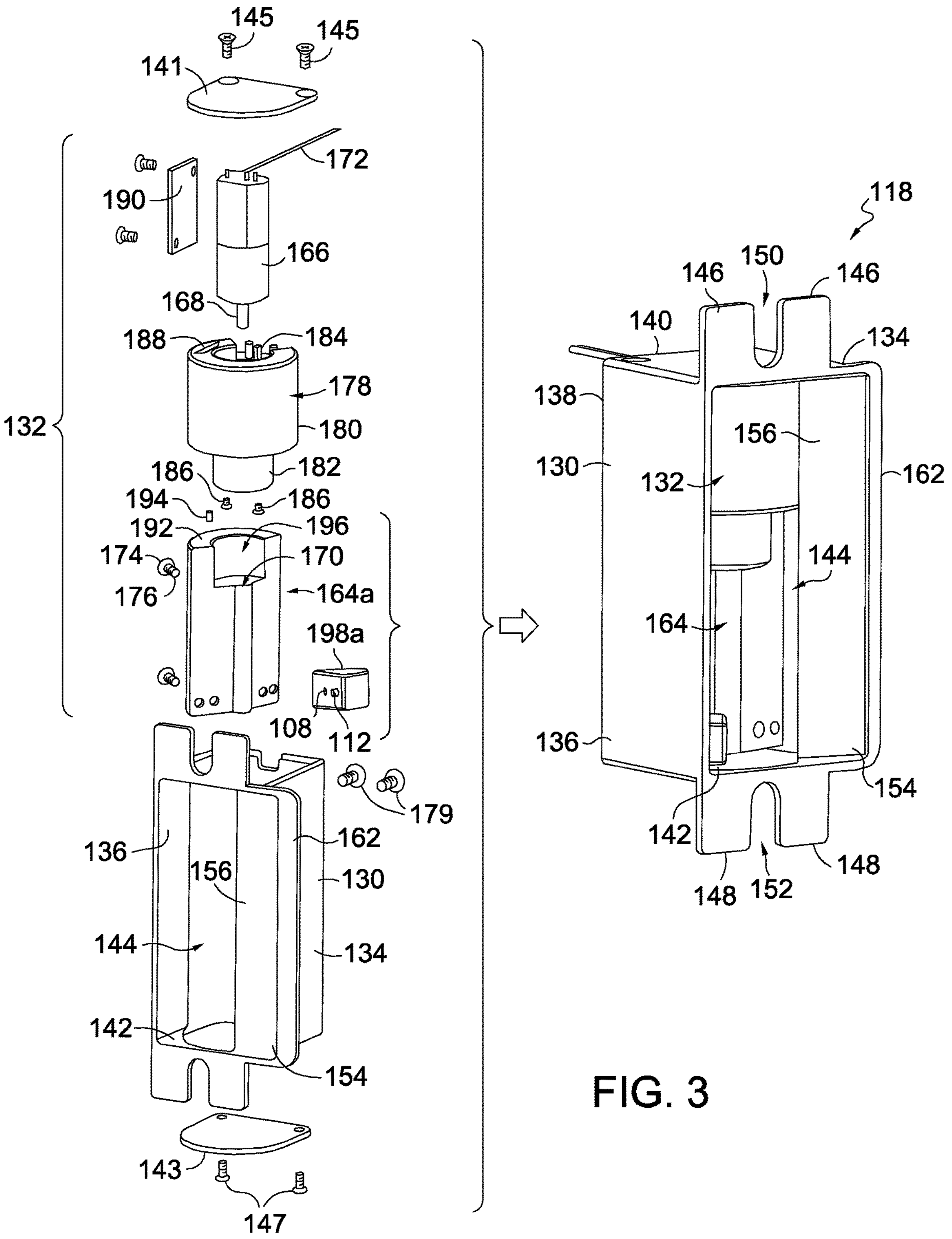
FIG. 3 is a composite exploded view and assembly view of a strike assembly in accordance with an aspect of the present invention (the assembly shown has an optional removable deadlatch cam)

An exploded view of electric strike assembly 118, in accordance with an embodiment of the invention, is shown in FIG. 3. In one aspect of the invention, the electric strike assembly may be configured or re-configured for use in conjunction with a variety of cylindrical-style and mortise-style locksets.

Figure 4A:
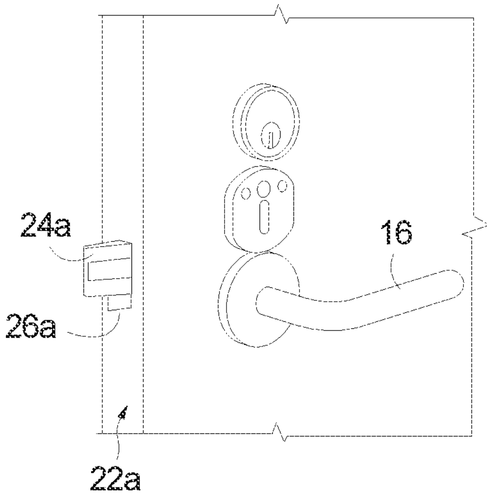
FIG. 4A is a view of a mortise lockset with a deadlatch offset below the latch.
Figure 4B:
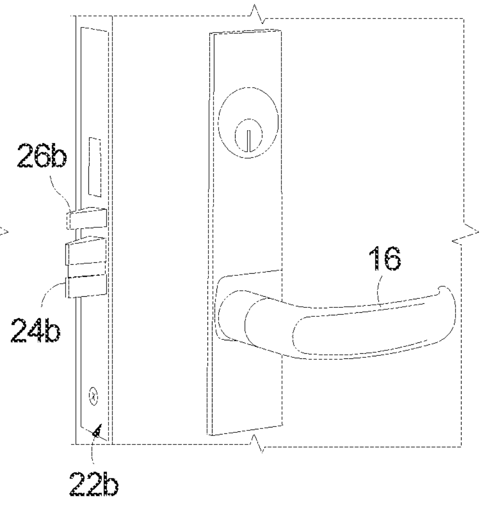
FIG. 4B is a view of a mortise lockset with a deadlatch offset above the latch.
Figure 4C:
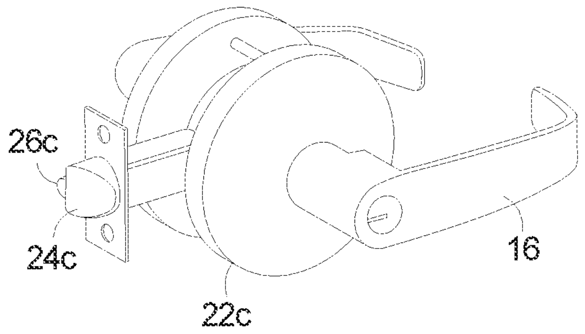
FIG. 4C is a view of a cylindrical lockset with a centered deadlatch.

With reference to FIGS. 4A-4B, and as will be discussed in greater detail below, electric strike assembly 118 may be configured to be compatible with a mortise-style lockset 22*a*/22*b* having a latch 24*a*/24*b* and offset deadlatch 26*a*/26*b* (FIG. 4A shows deadlatch 26*a* below latch 24*a*; FIG. 4B shows deadlatch 26*b* above latch 24*b*), or a cylindrical-style lockset 22*c* having a cylindrical latch 24*c* and deadlatch 26*c* wherein deadlatch 26*c* is central to latch 24*c* (FIG. 4C).

Turning once again to FIG. 3, electric strike assembly 118 is configured for use with a mortise-style lockset, such as lockset 22*a*, as shown in FIG. 4A. Electric strike assembly 118 generally comprises a strike housing 130 within which resides a latch release assembly 132. Strike housing 130 includes opposing side walls 134, 136 joined by a rear wall 138. Opposing end caps 140, 142 join side walls 134, 136 and rear wall 138 to thereby define a strike cavity 144 within which is received latch release assembly 132. In one aspect of the present invention, one or both end caps 140, 142 may include a removable plate 141, 143 and respective fasteners (such as screws) 145, 147, as will be discussed in greater detail below. Each end cap 140, 142 may also include respective outwardly extending tabs 146, 148 which include respective gaps 150, 152 configured to allow passage of respective fasteners, such as screws, therethrough for securing strike housing 130 into opening 15 of door frame 14. As will be discussed further below, in one aspect of the invention, clearance notch 15*a* need not be provided in the associated door frame for the receipt of electric strike 118 (see FIG. 2).

Figure 6A:
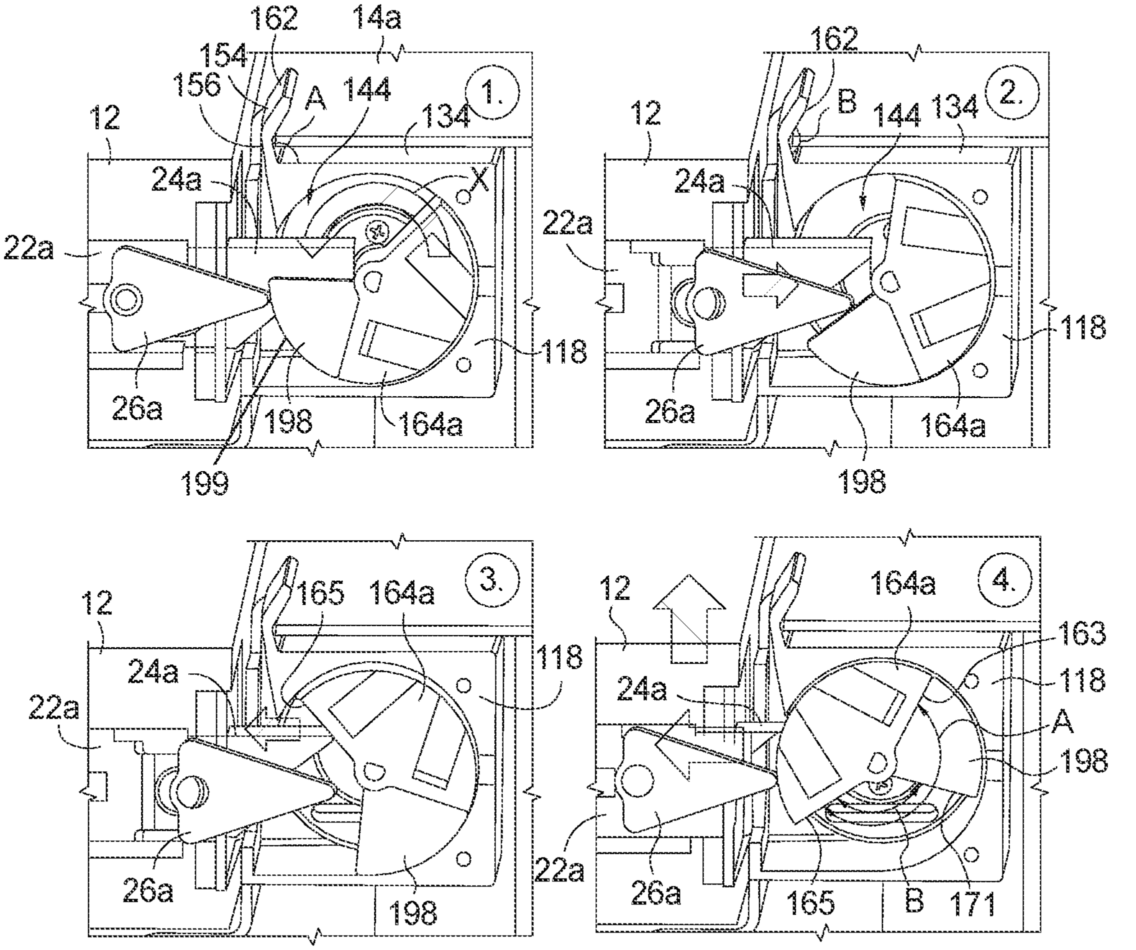
FIG. 6A is a stepwise illustration of the operation of the strike assembly shown in FIG. 3.

Side wall 134 may further include a ramped strike surface 154 which has a first portion 156 partially occluding strike cavity 144, which may extend past the outer bounds of side wall 134 (see FIG. 6A). With continued reference to FIG. 6A, first portion 156 may be disposed at an obtuse angle A with respect to side wall 134 such that, as for example, latch 24*a* and deadlatch 26*a* may slide out of strike cavity 144 as will be discussed in greater detail below. Strike surface 154 may also include a second portion 162 situated outside the outer bounds of side wall 134 and disposed at an obtuse angle B with respect to first portion 156. Angle B is dimensioned such that second portion 162 can more easily depress latch 24*a* and deadlatch 26*a*, as for example, when door 12 is being closed.

The following discussion, while presented specifically in reference to lockset 22*a*, unless otherwise stated, applies equally with reference to locksets 22*b* and 22*c*, and other locksets.

Referring further to FIG. 3, resident within strike cavity 144 is modular latch release assembly 132. Modular latch release assembly 132 generally includes two components—a motor and an interchangeable latch ejector 164 customized to work in conjunction with the particular lockset of the door release mechanism. Without limitation thereto, motor 166 may be a planetary gear motor. Motor 166 includes a rotatable shaft 168 which is configured to reside within a recess 170 defined within latch ejector 164. Powering of motor 166, such as via an electrical current passing through wires 172, rotates shaft 168, which in turn rotates latch ejector 164 so as to allow deadlatch 26*a* to be sequentially lowered into strike cavity 144, then to eject the mortise latch 24*a* and deadlatch 26*a* from strike cavity 144, as will be described in greater detail below. To facilitate the coupling of latch ejector 164 with shaft 168, latch ejector 164 may include a shaft screw 174 threadably inserted within a threaded bore in latch ejector 164 (not shown) whereby end 176 of screw 174 impinges upon shaft 168 such that rotation of the shaft is translated to latch ejector 164.

Latch release assembly 132 may further include a motor housing 178 having a stepped profile defining a wide upper portion 180 and a narrow lower portion 182. A recess 184 may be defined within motor housing 178 and is proportioned to receive motor 166 therein. Motor 166 may be secured within motor housing 178 through one or more fasteners 186. Motor housing 178 may then be secured within strike housing 130 by one or more fasteners, such as screws 179. Motor housing 178 may include a slot 188 defined within upper portion 180. Slot 188 may be proportioned to receive a printed circuit board (PCB) 190 with an integrated Hall Effect sensor. Latch ejector 164 may also include a well 192 defined therein configured to receive magnet 194. The Hall Effect sensor on PCB 190 may then sense the rotational position of latch ejector 164 using magnet 194. The position of latch ejector 164 may then be communicated and monitored, such as via authentication device 20, through wires 172. Lower portion 182 of motor housing 178 is proportioned to be received within recess 196 defined within latch ejector 164.

Optionally, the position sensor may be a High Speed Infrared Emitting diode acting as a transmitter coupled to a Silicon PIN Photodiode acting as a receiver, both readily available in the market and selected for the intended purpose without undue experimentation.

Latch ejector may be selectively configured for use in conjunction with a variety of locksets such as, for example, locksets 22*a*, 22*b* and 22*c*.

Figure 5:
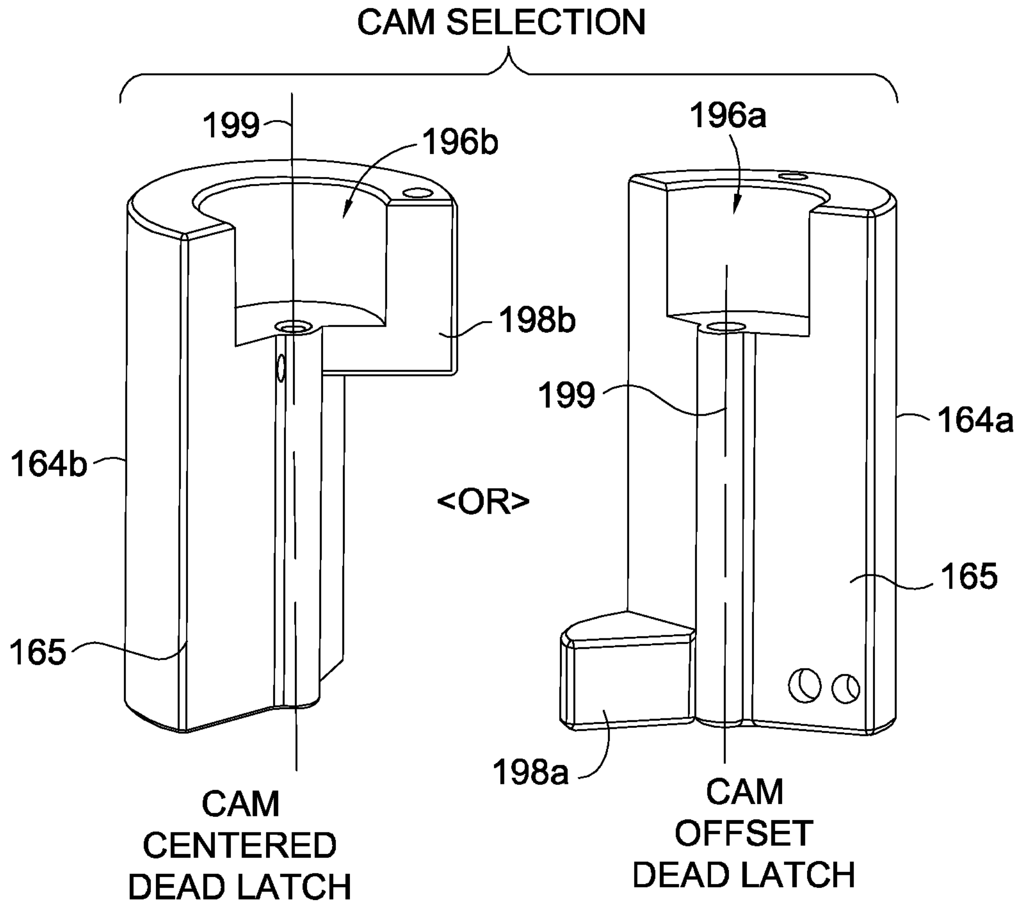
FIG. 5 is perspective views of two latch ejectors suitable for use within the strike assembly shown in FIG. 3.

As shown in FIG. 5, latch ejector 164*a* may be specifically configured for use in conjunction with mortise-style lockset 22*a*. When assembled within strike housing 130, latch ejector 164*a* is rotated about axis 199 by motor 166. Cam 198*a*, disposed distally from recess 196*a*, is configured to engage deadlatch 26*a* that is offset from latch 24*a* of mortise lockset 22*a*. As will be discussed in greater detail below, when door 12 is in a closed orientation, latch ejector 164 is rotated by motor 166 so that deadlatch 26*a* will be engaged by cam 198, placing deadlatch 26*a* in a depressed condition. At the same time, the rotational position of latch ejector 164 allows the latch (i.e., latch 24*a*) to extend into strike cavity 144 so as to be placed in the latched condition. As a result, door 12 is in a closed orientation and cannot be opened without actuation of lockset 22*a* via handle 16 or authentication device 20. Depressed deadlatch 26*a* prevents unauthorized opening of door 12 through "shimming" of the latch, such as via a credit card, as is known in the art.

Turning now to FIG. 6A, in accordance with an aspect of the present invention, operation of latch ejector 164*a* within a mortise-style lockset 22*a* is shown. Latch ejector 164*a* includes a leading edge 165 and a trailing edge 163, wherein leading edge 165 is disposed at a first angle A relative to trailing edge 163. Latch ejector 164*a* further includes cam 198 that extends from and is non-movably mounted to trailing edge 163. Cam 198 includes an outer cam surface 199 and a cam edge 171. Cam edge 171 is disposed at a second angle B relative to leading edge 165, wherein first angle A is greater than second angle B. First angle A may be a reflexive angle, second angle B may be an obtuse angle. The first angle A may be fixed, and the second angle B may be fixed. Step 1 begins with latch 24*a* received within strike cavity 144 while deadlatch 26*a* engages outer cam surface 199 of cam 198 such that the deadlatch is in the depressed condition thereby preventing unauthorized movement of latch 24*a*. Power is then supplied to motor 166 such that latch ejector 164*a* rotates as generally indicated by directional arrow X. At step 2, upon rotation of latch ejector 164*a*, deadlatch 26*a* is allowed to extend into strike cavity 144 and is operationally coupled with latch 24*a* as is known in the art. Continued rotation of latch ejector 164*a*, as shown generally in step 3, allows leading edge 165 of latch ejector 164*a* to engage latch 24*a*. As shown in step 4, further rotation of latch ejector 164*a* directs latch 24*a* and deadlatch 26*a* out of strike cavity 144. At this point, latch 24*a* is in the unlatch condition whereby opening of door 12 will cause latch 24*a* and deadlatch 26*a* to enter first portion 156 of ramped strike surface 154, then on to second portion 162 of ramped strike surface 154. Once the door has cleared electric strike assembly 118, latch 24*a* and deadlatch 26*a* will be biased outwardly of mortise lockset 22*a* as is known in the art. Closing of door 12 will cause latch 24*a* and deadlatch 26*a* to slide along second portion 162 of strike surface 154 until latch 24*a* is securely latched within strike cavity 144 and deadlatch 26*a* engages cam 198. Electric strike assembly 118 and mortise lockset 22*a* are then returned to the start of step 1 awaiting powering of motor 166 to repeat the unlatching operation shown in FIG. 6A.

Figure 6B:
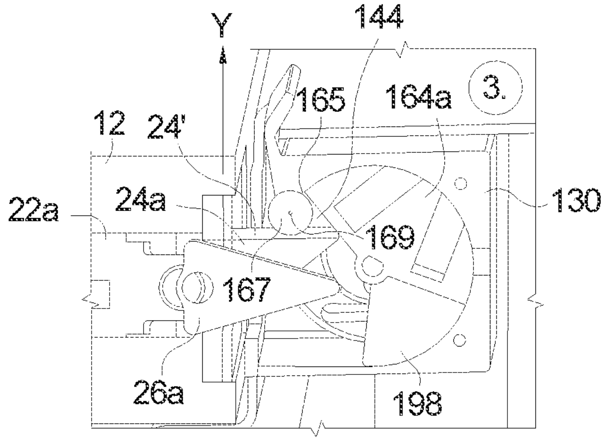
FIG. 6B is an operation view of the strike assembly including a latch roller.

Referring to FIG. 6B, step 3 of the above operational sequence is again shown. In a situation where an operator may begin to apply a force to open the door in direction Y before latch ejector 164*a* ejects latch 24*a* from strike cavity 144, as in step 4, a preload in the opposite direction of direction Y is placed on latch 24*a*. The preload may apply enough of a resistive force to latch 24*a* to make it more difficult to move latch 24*a* in a direction needed to eject latch 24*a* from strike cavity 144. To reduce the resistive force, latch roller 167 may be provided. Latch roller 167 may be rotationally fixed to strike housing via axis pin 169 and aligned with latch 24*a* when the latch is in cavity 144. Latch roller 167 is positioned to allow free entry of latch 24*a* into cavity 144 yet positioned close enough to face 24' of the latch to allow engagement between latch roller 167 and latch face 24' when a force in direction Y is applied to the door before latch 24*a* is ejected from strike cavity 144 by latch ejector 164*a*.

As discussed previously, there are numerous mortise-type lockset configurations. Referring again to FIG. 4A, the mortise-type lockset 22*a* for use with the above-described electric strike 118 positions deadlatch 26*a* below latch 24*a*. Another version of a mortise-type lockset 22*b* positions deadlatch 26*b* above latch 24*b* (see FIG. 4B). In one aspect of the invention, interchangeable latch ejector 164*a* may be substituted for latch ejector 164*b* so that a reconfigured electric strike may be used in conjunction with mortise-type lockset 22*b* (See FIG. 5). Latch ejector 164*b* operates similarly to latch ejector 164*a*, however, latch ejector 164*b* includes cam 198*b* is disposed proximate recess 196*b* and positioned to align with deadlatch 26*b* for engagement with deadlatch 26*b*.

Figure 7:
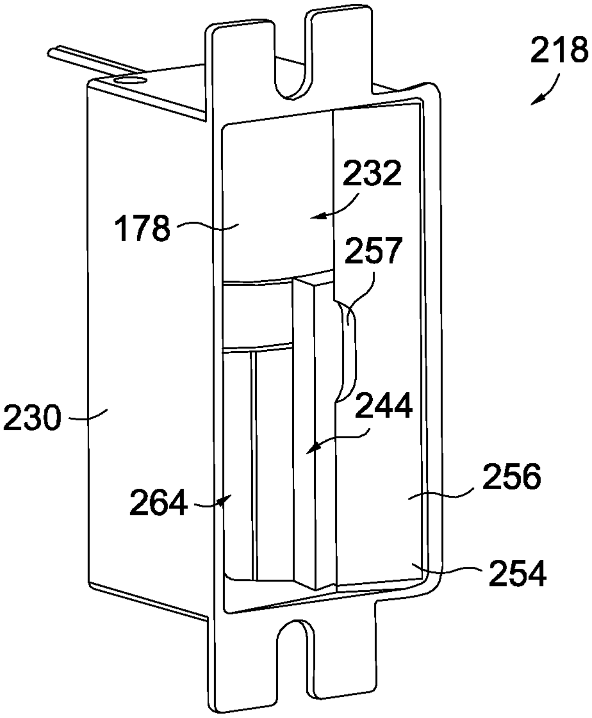
FIG. 7 is a perspective view of an electric strike assembly in accordance with another aspect the present invention.
Figure 8:
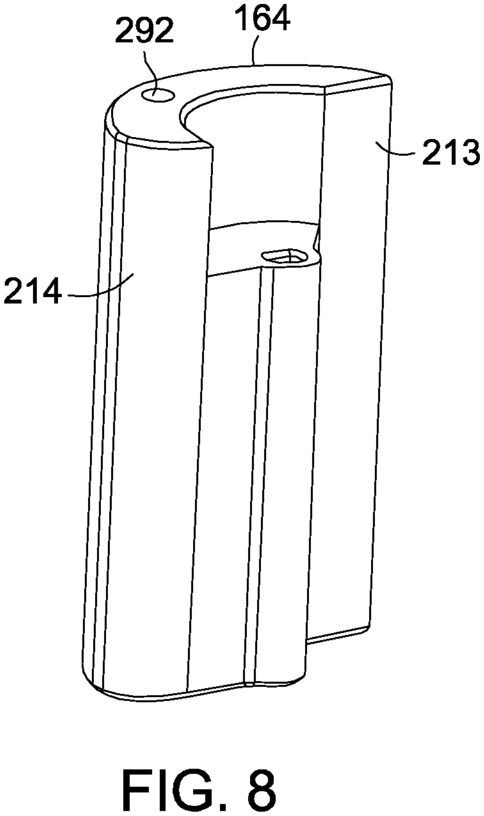
FIG. 8 is an isolated view of a latch ejector suitable for use within the electric strike shown in FIG. 7.
Figure 9:
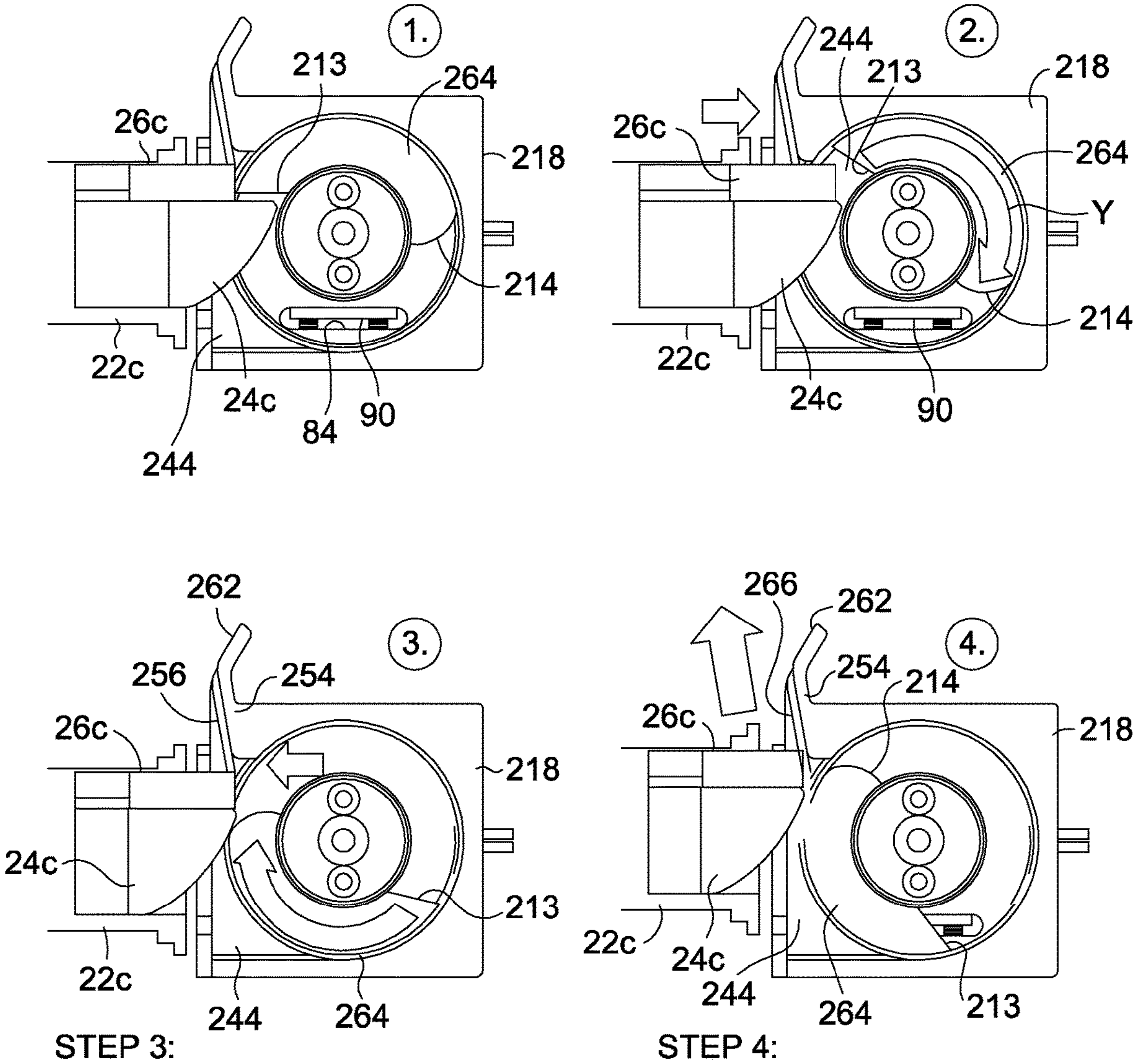
FIG. 9 is a stepwise illustration of the operation of the electric strike shown in FIG. 7.

As shown in FIGS. 7-9, in a further aspect of the present invention, an electric strike assembly 218 may be configured for use within a cylindrical-type lockset, such as shown in FIG. 4C. Strike assembly 218 generally comprises a strike housing 230 within which resides latch release assembly 232. Strike housing 230 is substantially identical to strike housing 130 described above with regard to an electric strike assembly compatible with a mortise-type lockset with the exception of first portion 256 of ramped strike surface 254. As shown most clearly in FIG. 7, first portion 256 may include a notched cut-out 257 configured to provide clearance such that the deadlatch (e.g., deadlatch 26*c*) may enter strike cavity 244 when door 12 is closed. Latch release assembly 232 generally comprises latch ejector 264 coupled to a motor resident within motor housing 178. Motor housing 178 may also include a slot for receiving a PCB therein as described above.

With reference to FIG. 9, latch ejector 264 includes a trailing edge 213 configured to engage deadlatch 26*c* when door 12 is closed in a latched condition while latch 24*c* is free to fully enter strike cavity 244. As will be discussed in greater detail below, the opposing leading edge 214 of latch ejector 264 is configured to engage latch 24*c* upon powering of the motor. To assist ejection of latch 24*c* from strike cavity 244, leading edge 214 may have a generally convex profile. Latch ejector 264 may also include a well configured to receive a magnet therein whereby the rotational orientation of latch ejector 264 may be monitored via a Hall Effect sensor integrated with PCB 90 as described above.

Turning again to FIG. 9, operation of latch ejector 264 is shown. Step 1 begins with latch 24*c* received within strike cavity 244 while deadlatch 26*c* engages latch ejector 264 proximate trailing edge 213 such that the deadlatch is in the depressed condition thereby preventing unauthorized movement of latch 24*c*. At step 2, power is the supplied to the motor such that latch ejector 264 rotates as generally indicated by arrow Y. Once trailing edge 213 no longer engages deadlatch 26*c*, deadlatch 26*c* is biased into strike cavity 244 and is coupled with latch 24*c* as is known in the art. Continued rotation of latch ejector 264, as shown generally in step 3, allows leading edge 214 of latch ejector 264 to engage latch 24*c* to begin ejecting latch 24*c* and deadlatch 26*c* from strike cavity 244. As shown in step 4, further rotation of latch ejector 264 directs latch 24*c* and deadlatch 26*c* fully out of strike cavity 244. At this point, latch 24*c* is in the unlatched condition whereby opening of door 12 will cause latch 24*c* and deadlatch 26*c* to slide down first portion 256 of ramped strike surface 254. Once the door has cleared electric strike 218, latch 24*c* and deadlatch 26*c* will be biased outwardly of cylindrical latch system 22*c* as is known in the art. Closing of door 12 will cause latch 24*c* and deadlatch 26*c* to slide along second portion 262 of strike surface 254 until latch 24*c* is securely latched within strike cavity 244 and deadlatch 26*c* engages latch ejector 264. Electric strike assembly 218 and cylindrical lockset 22*c* are then returned to the start of step 1 awaiting powering of motor 66 to repeat the unlatching operation shown in FIG. 9.

Figure 10:
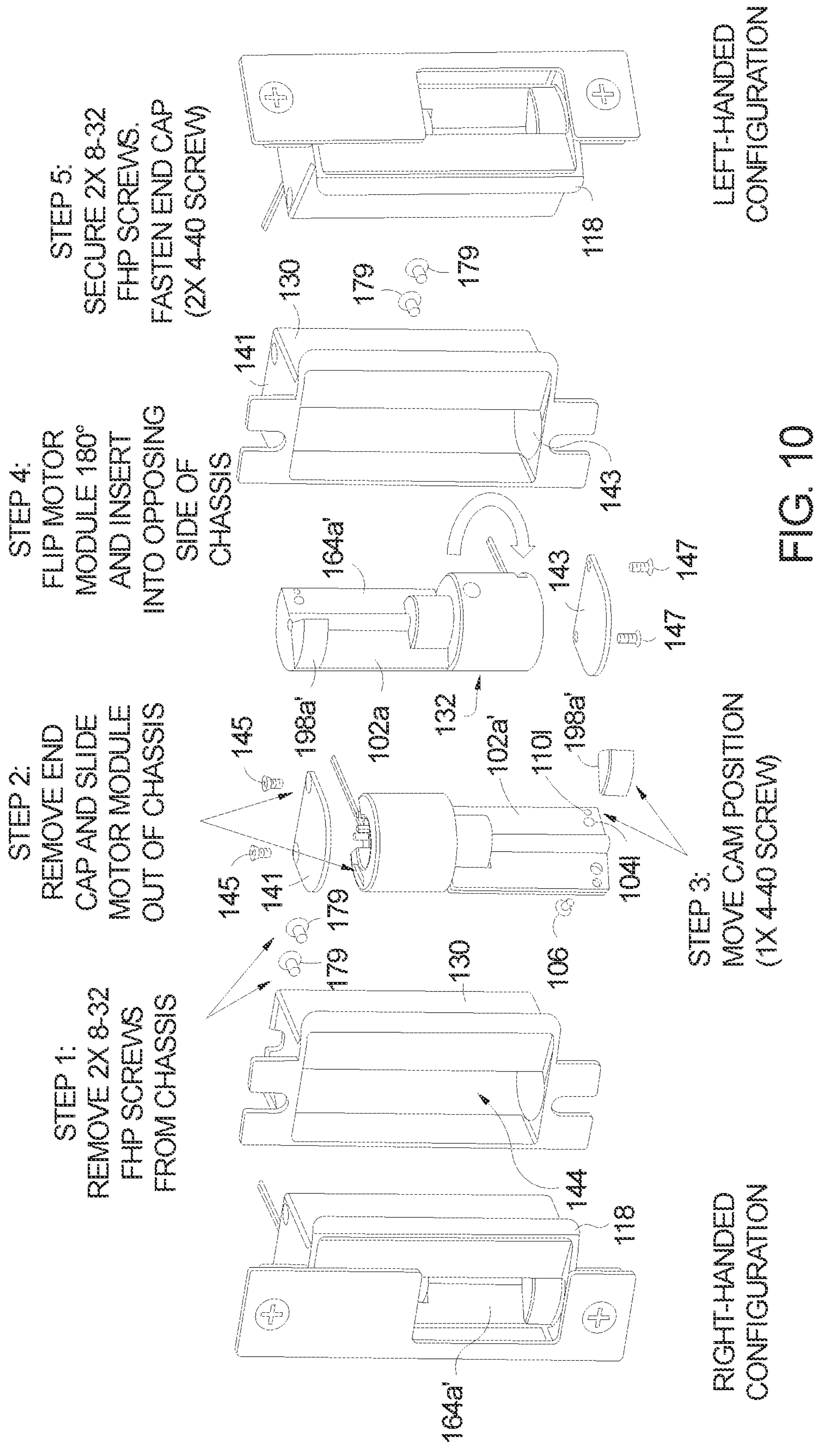
FIG. 10 is a stepwise illustration for swapping the handedness orientation of the electric strike assembly shown in FIG. 3.

In accordance with an aspect of the present invention, the handedness of an electric strike assembly compatible with lockset 22*a* having latch ejector 164*a* may be changed. As shown in FIG. 10, electric strike assembly 118 with latch ejector 164*a*' is initially set up in a right-handed configuration. As shown in step 1, screws 179 are removed from strike housing 130 whereby latch release assembly 132 may be removed from strike cavity 144. To facilitate removal of latch release assembly 132, in step 2, fasteners 145 are removed thereby allowing plate 141 to be removed from strike housing 130. It should be noted that plate 141 can be removed before removing screws 179. With plate 141 removed, latch release assembly 132 may be extracted from strike housing 130. In step 3, note that cam 198*a*' is removable from body 102*a*' of latch ejector 164*a*'. Cam mounting screw 106 is removed from latch ejector body 102*a*' such that cam portion 198*a*' is freed from latch ejector body 102*a*'. Cam 198*a*' may then be inverted such that module 112 (see FIG. 3) align with left-handed recess 110L when cam mounting screw 106 passes through left-handed aperture 104L to threadably engage cam aperture 108 (FIG. 3). With cam 198*a*' properly positioned on latch ejector body 102*a*', latch release assembly 132 may then be inverted (flipped) end-over-end at step 4 and reinserted within strike housing 130. To facilitate replacement of latch release assembly 132, plate 143 may be removed upon removal of fasteners 147. At step 5, screws 179 may then re-secure latch release assembly 132 within strike housing 130. Plates 141 and 143 are similarly re-secured to strike housing 130 via their respective fasteners 145, 147 to form a complete electric strike assembly 118. Electric strike assembly 118 may then be inverted (flipped) end-over-end thereby placing electric strike assembly 118 in a left-handed configuration as shown in FIG. 10.

To switch handedness of latch ejector 264, the above-referenced steps as shown in FIG. 10 may be completed with the exception of step 3 which requires removal of the cam mounting screw and relocation of a removable cam. Rather, as latch ejector 264 does not include a distinct cam, inversion of latch ejector 264 in an end-over-end fashion, such as to swap right-handedness for left-handedness, results in inversion of trailing and leading edges 213, 214 such that, when remounted within the strike housing, latch ejector 264 will be properly configured for left-handed operation.

While the invention has been described by reference to various specific embodiments, it should be understood that numerous changes may be made within the spirit and scope of the inventive concepts described. For example, in the embodiments described above, the latch ejector operates to sequentially disengage a deadlatch and then eject a door latch. In a further embodiment wherein the lockset does not include a deadlatch, the latch ejector, by its rotational movement, may operate to eject only a door latch from the associated strike housing cavity.

Accordingly, it is intended that the invention not be limited to the described embodiments, but will have full scope defined by the language of the following claims.

What is claimed is:

1. A method for selectively swapping an electric door strike assembly from either a left-handed or right-handed configuration to the other of the left-handed or right-handed configuration, wherein the electric door strike assembly is configured for use in conjunction with a cylindrical-type lockset of a door, wherein the cylindrical-type lockset includes a door latch selectively moveable from a latched condition when the door is in a closed orientation and an unlatched condition when the door is in an openable orientation, and wherein the cylindrical-type lockset includes a deadlatch configured to prevent unauthorized movement of the door latch when the door is in the closed orientation, the method comprising the steps of:

a) providing an electric door strike assembly having a strike housing including opposing side walls joined by at least one plate defining a strike cavity, wherein the strike housing is configured for being disposed within a door frame, wherein a latch release assembly is received within the strike cavity, wherein the latch release assembly includes a latch ejector rotatably connected to the strike housing about a first axis, wherein the latch ejector is configured to engage the deadlatch when the door is in the closed orientation, wherein the latch release assembly further includes a motor coupled to the latch ejector, wherein actuation of the motor rotates the latch ejector in a first rotational direction about the first axis to disengage the latch ejector from the deadlatch as the latch ejector is rotating in the first rotational direction about the first axis, and wherein further rotation of the latch ejector in the first rotational direction causes the latch ejector to engage the door latch whereby the door latch is moved from the latched condition to the unlatched condition such that the door is placed in the openable orientation;

b) removing the at least one plate from the opposing sidewalls forming an opening in the strike housing;

c) removing the latch release assembly from the strike cavity through the opening;

d) inverting the latch release assembly end-over-end;

e) inserting the inverted latch release assembly through the opening;

f) repositioning the at least one plate between the opposing sidewalls; and g) reinstalling the inverted latch release assembly within the strike cavity.

* * * * *